(12) United States Patent
Brody et al.

(10) Patent No.: US 8,172,076 B2
(45) Date of Patent: May 8, 2012

(54) DUAL APRON SEAL

(75) Inventors: Steve Eugene Brody, Kewanee, IL (US); Justin Michael Malohn, Princeton, IL (US); Terry Lynn Swearingen, Wyanet, IL (US); Travis John Grawe, Princeton, IL (US); Martin Andrew Yepsen, Kewanee, IL (US); Francis P. Polowy, Jr., Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 278 days.

(21) Appl. No.: 12/563,663

(22) Filed: Sep. 21, 2009

(65) Prior Publication Data

US 2010/0072035 A1 Mar. 25, 2010

Related U.S. Application Data

(60) Provisional application No. 61/099,066, filed on Sep. 22, 2008.

(51) Int. Cl.
*B65G 21/20* (2006.01)
(52) U.S. Cl. .................................................. 198/836.1
(58) Field of Classification Search ............... 198/836.1, 198/836.2, 836.3, 836.4
See application file for complete search history.

(56) References Cited

U.S. PATENT DOCUMENTS

| | | | | |
|---|---|---|---|---|
| 2,685,958 A * | 8/1954 | White, Jr. | .................... | 198/836.1 |
| 3,024,893 A * | 3/1962 | Lambert | .................... | 198/836.1 |
| 3,344,909 A * | 10/1967 | Hansen et al. | .............. | 198/836.1 |
| 3,499,523 A * | 3/1970 | Clegg | ........................... | 198/836.1 |
| 4,231,471 A * | 11/1980 | Gordon | ....................... | 198/836.1 |
| 4,641,745 A * | 2/1987 | Skates | ......................... | 198/836.1 |
| 5,016,747 A | 5/1991 | Veenhof | | |
| 5,048,669 A * | 9/1991 | Swinderman | ................. | 198/525 |
| 5,154,280 A * | 10/1992 | Mott | ............................. | 198/525 |
| 5,513,743 A * | 5/1996 | Brink | .......................... | 198/836.1 |
| 5,628,392 A | 5/1997 | Stoll et al. | | |
| 5,816,388 A * | 10/1998 | Bowman | .................... | 198/836.1 |
| 6,547,062 B2 * | 4/2003 | Wiggins | ..................... | 198/836.1 |
| 6,575,294 B1 * | 6/2003 | Swinderman et al. | ..... | 198/836.1 |
| 7,484,617 B1 * | 2/2009 | Flood et al. | ................ | 198/836.1 |
| 7,571,802 B2 * | 8/2009 | Bowman | .................... | 198/836.1 |
| 7,789,220 B2 * | 9/2010 | Bell et al. | ................... | 198/836.1 |
| 7,798,314 B2 * | 9/2010 | Simoens | .................... | 198/836.1 |
| 8,006,830 B2 * | 8/2011 | Swinderman | .............. | 198/836.1 |

FOREIGN PATENT DOCUMENTS

WO 2007148989 12/2007

\* cited by examiner

*Primary Examiner* — Douglas Hess
(74) *Attorney, Agent, or Firm* — Thompson Coburn LLP; Clyde L. Smith

(57) ABSTRACT

A seal member for sealing a conveyor belt is a monolithic homogeneous piece of material having opposite first and second halves and comprises first and second primary seals and first and second secondary seals. The first secondary seal is resiliently movable relative to the first primary seal. The second secondary seal is resiliently movable relative to the second primary seal. The first primary seal and the first secondary seal are part of the first half of the seal member. The second primary seal and the second secondary seal are part of the second half of the seal member. When the seals on one of the first and second halves of the seal member become excessively worn, the seal member can be flipped so that the seals on the other half of the seal member can be utilized.

12 Claims, 2 Drawing Sheets

DUAL APRON SEAL

CROSS-REFERENCE TO RELATED APPLICATIONS

This application is the non-provisional patent application of Ser. No. 61/099,066 filed on Sep. 22, 2008, which is pending.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention pertains to bulk material conveyor belt systems. More particularly, the present invention pertains to seal members for preventing bulk material from migrating off of conveyor belts.

2. Related Art

It is known to provide barrier seal assemblies on bulk material conveyor belt systems. It is also known to provide such barrier seal assemblies with seal members that comprise a seal that is biased against the conveyor belt to preventing bulk material from migrating off of the conveyor belt.

SUMMARY OF THE INVENTION

In a first aspect of the invention, a seal member for sealing a conveyor belt is a monolithic homogeneous piece of material having opposite first and second halves and comprises first and second primary seals and first and second secondary seals. The first secondary seal is resiliently movable relative to the first primary seal. The second secondary seal is resiliently movable relative to the second primary seal. The first primary seal and the first secondary seal are part of the first half of the seal member. The second primary seal and the second secondary seal are part of the second half of the seal member. When the seals on one of the first and second halves of the seal member become excessively worn, the seal member can be flipped so that the seals on the other half of the seal member can be utilized.

In another aspect of the invention, a method comprises accessing a conveyor belt system. The conveyor belt system comprises a conveyor belt and a barrier seal assembly. The barrier seal assembly comprises a seal member and a sealing clamp. The seal member comprises first and second primary seals and first and second secondary seals. The seal member is clamped via the sealing clamp to the barrier seal assembly in a first orientation relative to the conveyor belt. The first secondary seal is resiliently biased against the conveyor belt when the seal member is in the first orientation. The method further comprises unclamping the sealing clamp in a manner releasing the seal member from the barrier seal assembly. Furthermore, the method comprises rotating the seal member into a second orientation relative to the conveyor belt from the first orientation. The second secondary seal is resiliently biased against the conveyor belt when the seal member is in the second orientation. The first secondary seal is unengaged with the conveyor belt when the seal member is in the second orientation. Still further, the method comprises clamping the sealing member to the barrier seal assembly via the sealing clamp while the seal member is in the second orientation.

Further features and advantages of the present invention, as well as the structure and operation of various embodiments of the present invention, are described in detail below with reference to the accompanying drawings.

Figure 1:
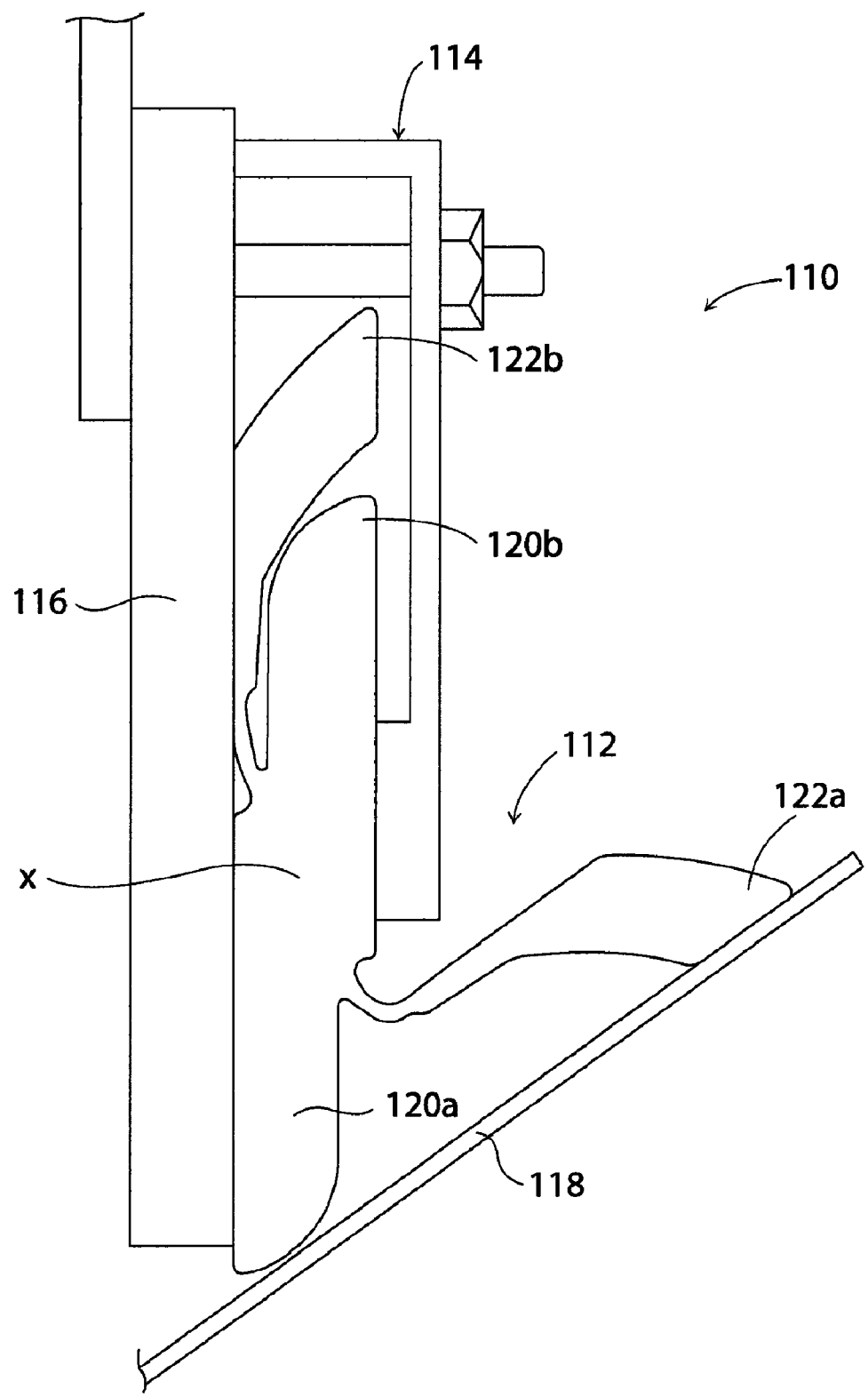
FIG. 1 is an enlarged fragmented, cross-sectional view of a barrier seal assembly having a seal member positioned adjacent a belt of a bulk material conveyor system.

Reference numerals in the written specification and in the drawing figures indicate corresponding items.

DETAILED DESCRIPTION OF THE PREFERRED EMBODIMENT

A barrier seal assembly 110 of the present invention is incorporated in a conveyor system such as that described in U.S. patent application Ser. No. 12/234,384 ("the '384 Application"), entitled Exteriorly Mounted Wear Liner For Bulk Material Conveyor Belt Systems, incorporated herein in its entirety.

Each barrier seal assembly 110 includes a seal member 112, and a sealing clamp 114. The seal member 112 may be made of rubber, polyurethane or other similar materials. Preferably, the seal is of EPDM and preferably has a durometer hardness of 70 (Shore D). The seal member 112 is adapted to replace the seal 64 of the '384 Application. The sealing clamp 114 is preferably the same as the sealing clamp 66 disclosed in the '384 Application. The sealing clamp 114 clamps the seal member 112 against a wear liner 116 directly above a conveyor belt 118. Preferably, the wear liner 116 is the same as the wear liner 32 disclosed in the '384 Application. Preferably, the seal member 112 is formed of a single unitary extrusion. Each seal member 112 comprises first and second primary seals 120a, 120b and first and second secondary seals 122a, 122b. The primary seal 120a or 120b presses against the belt 118 to contain material passing under the wear liner 116. The secondary seal 122a or 122b is resiliently urged against the belt 118 to contain fines that pass under the primary seal in order to redirect them back into the belt.

Figure 2:
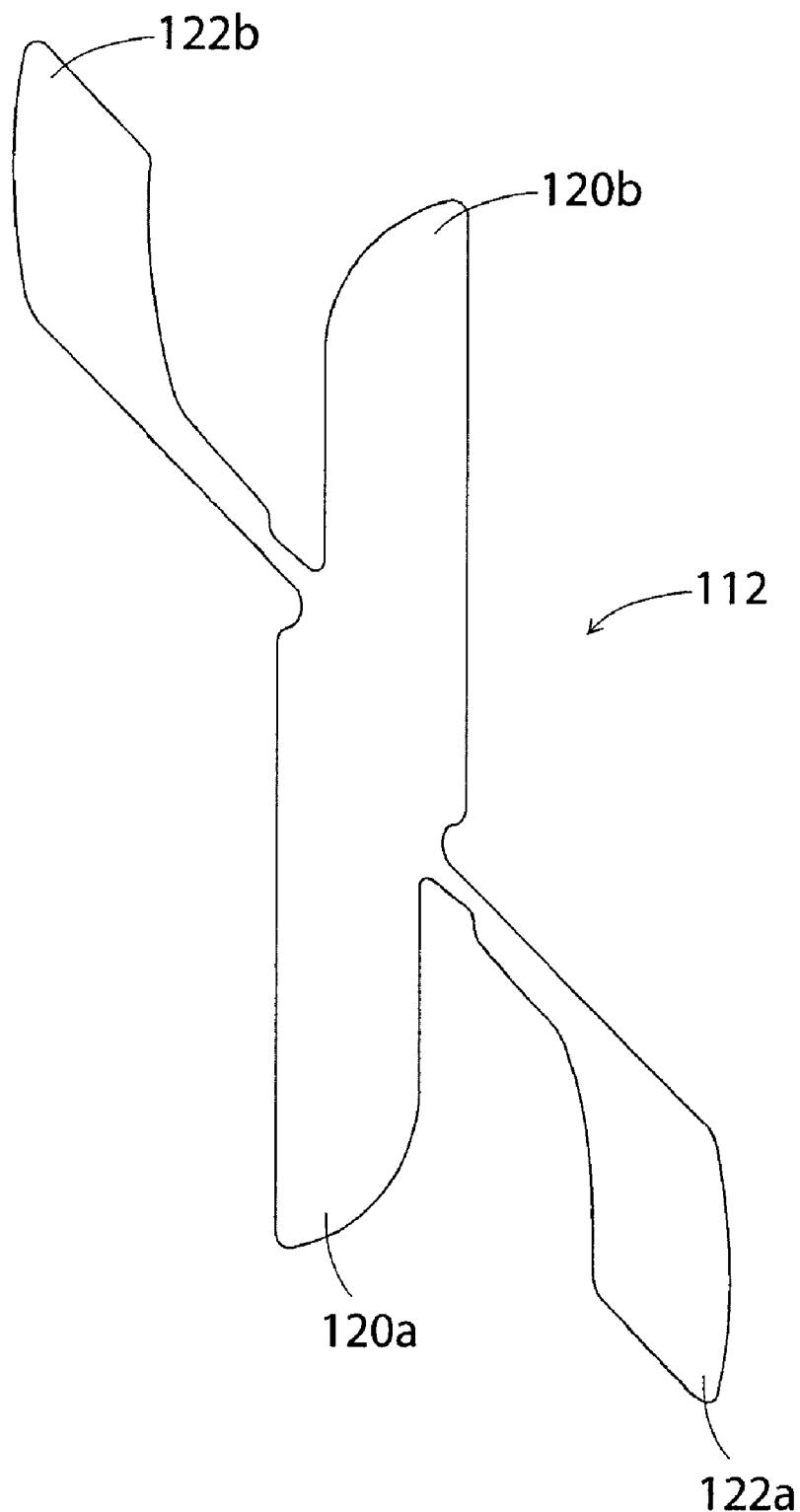
FIG. 2 is a cross-sectional view of the seal member of FIG. 1 with the seal member being in an unflexed state.

As shown in FIG. 1, the seal member 112 is positioned so that the first primary seal 120a and the first secondary seal 122a are in a sealing position, and the second primary seal 120b and the second secondary seal 122b are in a reserve position. In particular, the seal member 112 is positioned such that the first primary seal 120a and the first secondary seal 122a are adjacent the belt 118, and the second primary seal 120b and the second secondary seal 122b are upward and away from the belt. Because of the cross-sectional shape of the seal member 112, the second secondary seal 122b is deflected inward by the wear liner 116 and does not interfere with the securement of the seal member between the wear liner and sealing clamp 114. FIG. 2 shows the seal member 112 with the secondary seals 122a and 122b being in unflexed positions. Preferably, the cross-sectional shape of the seal member 112 is such that rotating the seal member 180° about a horizontal axis parallel to the seal member (e.g., the longitudinal axis x of the seal member) orients the second primary seal 120b and the second secondary seal 122b in the sealing position and orients the first primary seal 120a and the first secondary seal 122a in the reserve position. Preferably, the cross-sectional shape of the seal member 112 is such that the shape and orientation of the first primary seal 120a when the first primary seal is in its sealing position is at least substantially the same as the shape and orientation of the second primary seal 120b when the second primary seal is in its sealing position. Likewise, the cross-sectional shape of the seal member 112 is preferably such that the shape and orientation of the first secondary seal 122a when the first secondary seal is in its sealing position is at least substantially the same as the shape and orientation of the second secondary seal 122b when the second secondary seal is in its sealing position.

In operation, as the first primary seal 120a and first secondary seal 122a wear, a user progressively moves the seal member 112 downward to maintain the desired position of the first primary and secondary seals relative to the belt 118, until the first primary and secondary seals are so worn that they are not suitably effective. Then, the seal member 112 is released from the sealing clamp 114, rotated 180° about the horizontal axis x, and then re-clamped by the sealing clamp such that the second primary seal 120b and the second secondary seal 122b are in their sealing positions.

The cross sectional shape of an alternative seal member (not shown) of the present invention is symmetrical about a longitudinal horizontal plane, as viewed when the alternative seal member is oriented like the seal member 112 of FIG. 1. With the alternative seal member, it is insufficient to rotate the seal member about a horizontal axis parallel to the seal member. Instead, a user may rotate the seal member about a longitudinal axis of the seal member and switch the left and right seal members (assuming the conveyor system has seal members on the opposite sides of the conveyor belt) so that the second primary seal and second secondary seal of the alternative seal member is properly oriented in sealing positions. If the user desires to move the alternative seal member so that the second primary seal and second secondary seal are in their sealing positions with the seal member without moving the seal member to the opposite side of the belt, the user may rotate the seal member 180° about an axis perpendicular to the longitudinal axis of the seal member, or any other sequence of movements that result in the same final position.

In view of the foregoing, it should be appreciated that the invention achieves the several advantages over prior art seal members.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A seal member for sealing a conveyor belt, the seal member being a monolithic homogeneous piece of material having opposite first and second halves and comprising first and second primary seals and first and second secondary seals, the first secondary seal being resiliently movable relative to the first primary seal, the second secondary seal being resiliently movable relative to the second primary seal, the first primary seal and the first secondary seal being part of the first half of the seal member, the second primary seal and the second secondary seal being part of the second half of the seal member, the first half of the seal member being symmetric to the second half of the seal member about an axis.

2. A conveyor belt system, the conveyor belt system comprising a conveyor belt and a barrier seal assembly, the barrier seal assembly comprising a seal member and a sealing clamp, the seal member being a monolithic homogeneous piece of material having opposite first and second halves and comprising first and second primary seals and first and second secondary seals, the first secondary seal being resiliently movable relative to the first primary seal, the second secondary seal being resiliently movable relative to the second primary seal, the first primary seal and the first secondary seal being part of the first half of the seal member, the second primary seal and the second secondary seal being part of the second half of the seal member, the seal member being clamped to the barrier seal assembly via the sealing clamp in a manner such that the first secondary seal is resiliently biased against the conveyor belt and such that the second secondary seal is unengaged with the conveyor belt.

3. A conveyor belt system in accordance with claim 2 wherein the barrier seal assembly further comprises a wear liner and the seal member is clamped against the wear liner via the sealing clamp.

4. A conveyor belt system in accordance with claim 3 wherein the first half of the seal member is symmetric to the second half of the seal member.

5. A conveyor belt system in accordance with claim 4 wherein the first half of the seal member is symmetric to the second half of the seal member about an axis.

6. A method comprising:
  accessing a conveyor belt system, the conveyor belt system comprising a conveyor belt and a barrier seal assembly, the barrier seal assembly comprising a seal member and a sealing clamp, the seal member comprising first and second primary seals and first and second secondary seals; the seal member being clamped via the sealing clamp to the barrier seal assembly in a first orientation relative to the conveyor belt, the first secondary seal being resiliently biased against the conveyor belt when the seal member is in the first orientation;
  unclamping the sealing clamp in a manner releasing the seal member from the barrier seal assembly;
  rotating the seal member into a second orientation relative to the conveyor belt from the first orientation, the second secondary seal being resiliently biased against the conveyor belt when the seal member is in the second orientation, the first secondary seal being unengaged with the conveyor belt when the seal member is in the second orientation; and
  clamping the sealing member to the barrier seal assembly via the sealing clamp while the seal member is in the second orientation.

7. A method in accordance with claim 6 wherein the seal member is rotated one hundred and eighty degrees relative to the conveyor belt during the step of rotating the seal member into the second orientation from the first orientation.

8. A method in accordance with claim 7 wherein the seal member is rotated one hundred and eighty degrees about an axis that is generally parallel to the conveyor belt during the step of rotating the seal member into the second orientation from the first orientation.

9. A method in accordance of claim 6 wherein the barrier seal assembly comprises a wear liner and the seal member is biased against the wear liner via the sealing clamp when the sealing member is clamped in the first orientation and when the sealing member is clamped in the second orientation.

10. A method in accordance with claim 6 wherein the seal member comprises first and second halves, the first primary seal and the first secondary seal are part of the first half of the seal member, the second primary seal and the second secondary seal are part of the second half of the seal member, and the first half of the seal member is symmetric to the second half of the seal member.

11. A method in accordance with claim 10 wherein the first half of the seal member is symmetric to the second half of the seal member about an axis.

12. A method in accordance with claim 11 wherein the seal member is rotated one hundred and eighty degrees about the axis during the step of rotating the seal member into the second orientation from the first orientation.

* * * * *